United States Patent [19]
Barnes et al.

[11] Patent Number: 5,724,515
[45] Date of Patent: Mar. 3, 1998

[54] PACKET RADIO COMMUNICATION SYSTEM

[75] Inventors: Keith W. Barnes; Donald R. Bauman, both of Waseca, Minn.

[73] Assignee: E. F. Johnson Company, Burnsville, Minn.

[21] Appl. No.: 611,639

[22] Filed: Mar. 6, 1996

[51] Int. Cl.$^6$ ................................................. G06F 17/00
[52] U.S. Cl. ................................................. 395/200.17
[58] Field of Search ........................... 364/514 R, 514 E; 395/200.17; 370/474, 476, 448, 445, 913, 349

[56] References Cited

U.S. PATENT DOCUMENTS

| | | | |
|---|---|---|---|
| 4,234,952 | 11/1980 | Gable et al. | 370/448 |
| 4,357,700 | 11/1982 | Alvarez, III et al. | 370/83 |
| 4,516,239 | 5/1985 | Maxemchuk | 370/445 |
| 4,750,109 | 6/1988 | Kita | 370/355 |
| 5,056,139 | 10/1991 | Littlefield | 380/20 |
| 5,142,550 | 8/1992 | Tymes | 375/1 |
| 5,392,283 | 2/1995 | Bocci et al. | 370/79 |
| 5,416,779 | 5/1995 | Barnes et al. | 370/29.1 |
| 5,471,470 | 11/1995 | Sharma et al. | 370/81 |
| 5,619,530 | 4/1997 | Cadd et al. | 370/445 |
| 5,627,829 | 5/1997 | Gleeson et al. | 370/349 |

*Primary Examiner*—Ellis B. Ramirez
*Attorney, Agent, or Firm*—Schwegman, Lundberg, Woessner & Kluth, P.A.

[57] ABSTRACT

A packet radio communications system having a protocol which provides for nonstandard communications. The protocol providing a standard format indicator to indicate whether a received packet is in a standard or nonstandard format. If the standard format indicator signals a standard packet format, then all transceivers understand the standard information contained in the packet. Transceivers which do not understand the nonstandard format will ignore the nonstandard packet and discard it. The nonstandard format contains a format type code which is decoded along with the standard format indicator to distinguish one manufacturer's nonstandard packet format from another manufacturer's nonstandard packet format. The nonstandard protocol is expanded to manage multiple block packetized transmissions. A Message Continuance (MC) field is incorporated into the header information of the packet to signal the beginning, middle, and end of a multi-block transmission.

36 Claims, 3 Drawing Sheets

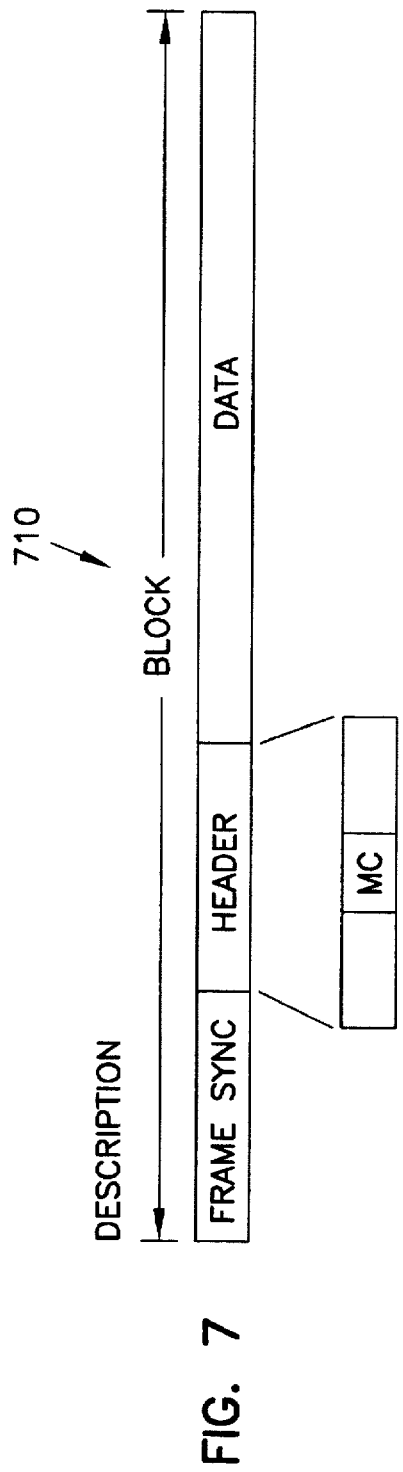

PACKET RADIO COMMUNICATION SYSTEM

FIELD OF THE INVENTION

The present invention relates generally to packet radio communications and in particular to a packet radio communication system using a special packet protocol to transceive control and data information between a number of transceivers.

BACKGROUND OF THE INVENTION

Packet radio systems offer a communication system in which several remote transceivers can communicate to a central station over a single channel. One example of a packet radio system is a professional (or private) mobile radio (PMR) system. PMR systems are used to provide communications for fire, police, and any other professional or private use.

A PMR system for police use may contain a number of remote transceivers, located in police cars and in other portables. The remote transceivers may communicate with a repeater or repeater system to provide wide area communications coverage. The repeater system may be linked by a network bus.

A packet radio protocol is used to organize communications by the remote transceivers over the common channel. The protocol is used to handle overlapping transmissions, and in some applications, reduce the number of overlapping packet transmissions. Several packet radio protocols have been developed for packet radio communications. One such protocol is called Carrier Sense Multiple Access (CSMA).

In a CSMA packet radio system, the remote transceivers listen to the channel before sending their packets. The remote transceivers use the received information to monitor the status of the channel. Several variations of CSMA have evolved to detect a free channel.

A packet format protocol for CSMA systems includes control and data portions of the packetized information. Packet format standards have been developed to standardize the format of digital data contained in the packets. The standards provide commonality of transceiver design and transmission compatibility. The packets contain digital data and control information. The data and control information may be used to communicate between a number of different transceivers and may also be used to control various infrastructure equipment, such as repeaters and network controllers.

The packet radio protocols employed by a packet radio system are a function of the types of communications provided by the system and the packet format selected for the system.

Vendors may expand the functions of the packet radio system to perform customized operations and tailor the communications to the applications at hand. In these cases, the standard packet formats fail to provide adequate data and command capabilities for the new system.

Therefore, there is a need in the art for a packet radio communication system which provides nonstandard packet formats for enhanced data and control communications. The packet radio communication system should perform standard operations on standard packets and recognize nonstandard packet formats to perform specialized nonstandard communications. The nonstandard packets should be ignored by standard receivers without affecting their normal operation. The nonstandard packet formats should also be flexible to accommodate a variety of data transfer applications.

SUMMARY OF THE INVENTION

The present communication system provides a standard format indicator which is a code to indicate whether a received packet is in a standard or nonstandard format. In one embodiment, a nonstandard packet is divided into a standard portion and a nonstandard portion. The standard format indicator is included in the standard portion. A system is described to read the nonstandard information contained in the nonstandard packet, based on the standard format indicator.

If the standard format indicator signals a standard packet format, then all transceivers understand the standard information contained in the packet. If the standard format indicator signals a nonstandard packet format, then transceivers equipped with the nonstandard features decode the packet according to a predefined system and perform the respective nonstandard function. Transceivers which do not understand the nonstandard format will ignore the nonstandard packet and discard it.

In one embodiment the standard format indicator field consists of a single bit. The single bit standard format indicator is common to both the standard format and the nonstandard format. In an alternate embodiment the nonstandard format contains a manufacturer's identification code which is decoded along with the standard format indicator to distinguish one manufacturer's nonstandard packet format from another manufacturer's nonstandard packet format.

In yet another embodiment, a nonstandard protocol is expanded to manage multiple block packetized transmissions. A message continuance (MC) field is incorporated into the header information of the packet to signal the beginning, middle, and end of a multi-block transmission.

BRIEF DESCRIPTION OF THE DRAWING

In the drawings, where like numerals describe like components throughout the several views:

FIG. 7 shows one example of a modified packet having a Message Continuance (MC) field; and FIG. 8 shows one example of Message Continuance Field Codes for a single block transmission and a multiple block transmission.

DETAILED DESCRIPTION

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

For the purposes of this document, a link is any communication transmission path from the modulator and transmitter, through the channel, and up to and including the receiver and demodulator. The channel is any propagating medium between the transmitter and the receiver.

Standard Format Indication

Figure 1:
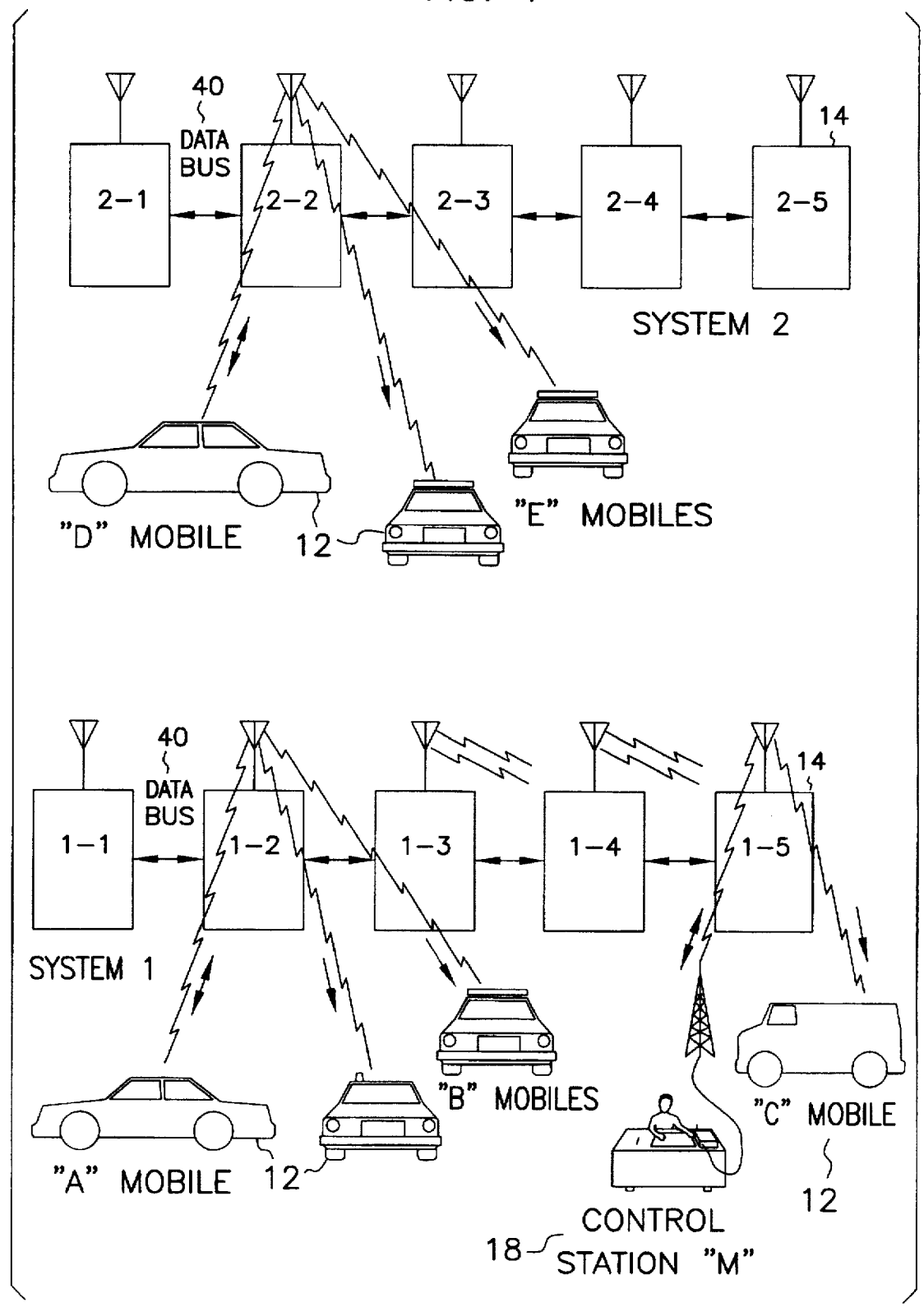
FIG. 1 is a block diagram showing a land mobile transmission trunked communication system.

FIG. 1 shows a land mobile transmission trunk communication system, which is one environment in which the present invention may be practiced. The communication system of FIG. 1 is one example of a professional (or private) mobile radio (PMR) system. In this example, the mobile transceivers 12 (mobiles A, B and C) and the control station 18 of system 1 are a separate network from the mobiles 12D and 12E of system 2. The transceivers in the mobiles 12 communicate with the repeaters 14 via packetized transmissions. Those skilled in the art will readily recognize that the present communication system may be applied to other communication systems without departing from the scope and spirit of the present invention.

Figure 2:
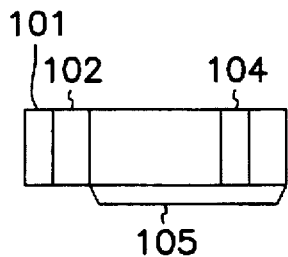
FIG. 2 is one example of a packet format.

FIG. 2 shows one example of a packet format for communications between the transceivers 12 and the repeaters 14. Packets 105 containing voice and link control information are transmitted by repeaters 14 to mobile transceivers 12 to provide signalling information for the mobile transceivers 12. In this embodiment, data 101 is a 48 bit frame synchronization word. Data 102 is a 64 bit network identifier and checksum word. Data 105 is the voice and link control information, including data 104 as a link control portion of the information.

Figure 3:
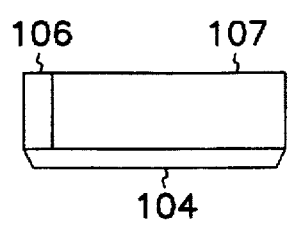
FIG. 3 is an expanded view of a portion of the packet format shown in FIG. 2 when the format indicator signals a standard packet.

FIG. 3 shows an expanded view of the link control portion 104 of packet 105 of FIG. 1. Bit 106 is the standard format indicator and data 107 is the data of the link control portion of the packet. FIG. 3 is a standard format link control portion 104, which may be compared to the nonstandard link control portion 104' of FIG. 4. The nonstandard link control portion 104' contains the standard format indicator 106 and a format type indicator 108. Data 109 is the data of the nonstandard link control portion 104'.

Figure 4:
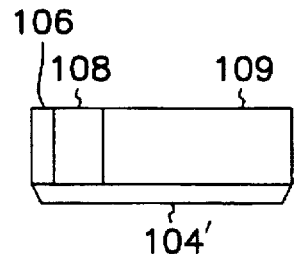
FIG. 4 is an expanded view of a portion of the packet format shown in FIG. 2 when the format indicator signals a nonstandard packet.

In one embodiment, standard format indicator 106 is a single bit which is a first Boolean state to indicate a standard format packet and a second Boolean state to indicate a nonstandard packet format. The format type indicator 108 of FIG. 4 is used only when a nonstandard packet is transmitted in the system. The format type indicator 108 is encoded to define the data 109 for specialized packet radio functions. For example, 109 might be designated by a manufacturer for a dispatcher to command a radio to return its current vehicle location service without any conflict with the standard operations of radios. Then, at some later date, the communications industry is free to agree on a standard format for the new service.

If the standard format indicator indicates a standard packet, then the format must conform to the standard so that all standard radios correctly interpret and utilize the information in the packet. If the standard format indicator is nonstandard, then radios (i.e. standard radios) which are not programmed to understand the special format will ignore the packet by discarding it. A manufacturer is free to use whatever format and information he desires in the nonstandard portion of the packet.

In one embodiment, the standard format indicator field consists of only a single bit, making it very efficient. In nonstandard packets, an additional piece of information is the Manufacturer's Identity (MFID) field. This field allows one manufacturer's nonstandard format to be distinguished from another manufacturer's nonstandard format.

Figure 5:
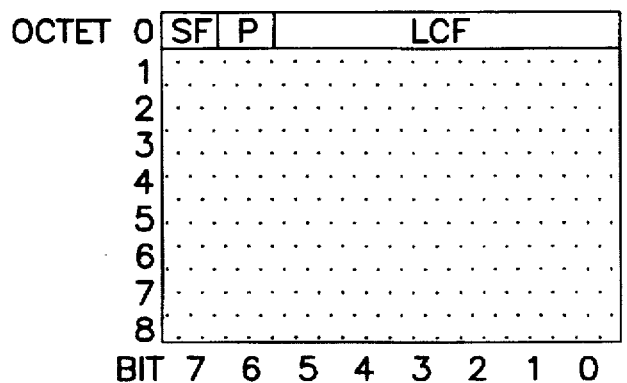
FIG. 5 shows one example of a standard link control word.

FIG. 5 shows an application of one embodiment of the present invention to a link control word 510 having 72 bits of information. The link control word 510 is error coded and contains a concatenated code of Reed-Solomon and a shortened Hamming code. These codes expand the link control word 510 to a total of 240 bits. The formats shown, however, in FIG. 5 are only information bits.

In octet 0, the SF bit indicates whether the format is standard or nonstandard. The SF bit is equal to a 0 for standard formats and 1 for nonstandard formats. Bit P of link control word 510 indicates whether the information in the word is protected or not. If bit P is equal to a logical 1, then the message is protected and octets 1–8 are encrypted, as shown in the shaded area of FIG. 5. If bit P is a logical 0, then the link control word 510 is not encrypted. Bits 0–5 are designated as the link control format (LCF). The LCF is coded with values of 0–31 for different commands.

Figure 6:
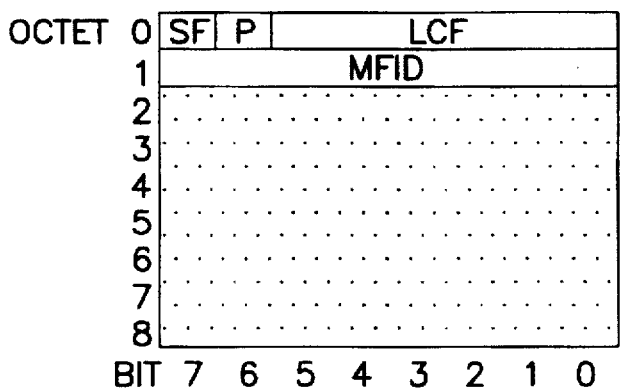
FIG. 6 shows one example of a nonstandard link control word.

FIG. 6 shows a nonstandard link control word 610 according to one embodiment of the present invention. The nonstandard link control word 610 contains an extra manufacturer's identification word (MFID) which is used in conjunction with the standard format bit to indicate a nonstandard format and to indicate how to decode the following information contained in octets 2–8. In one embodiment, the MFID is a format type code which is preselected by the vendor to indicate which specialized function or data collection the present system is transceiving. One example of a MFID is a hexadecimal 8 bit code of 40 to represent Manufacturer Alpha, a code of 41 to represent Manufacturer Beta, and a code of 42 to represent Manufacturer Gamma. Manufacturer Alpha may then arbitrarily choose LCF code 3 to indicate "This is the Vehicle Location" followed by data indicating an X-coordinate and a Y-coordinate. Manufacturer Beta, who has no vehicle location service, but is identified by a MFID code of 41, is free to use the exact same LCF code of 3 to indicate a completely different service that it wishes to offer—for example, having its radios report their "time-in-service." Manufacturer Gamma offers neither service and ignores both non-standard packets. The distinguishing MFID in the non-standard packets allows all three manufacturers' radios to co-exist on the same system while ignoring services that they do not understand.

Those skilled in the art will readily recognize that other packet formats may be adapted to incorporate the benefits of the present invention.

Multiple Block Indication

Returning to FIG. 1, signaling messages containing signaling and sometimes small amounts of user data information are transmitted between mobile transceivers 12 and communication repeaters 14.

For data synchronization and recovery, it is convenient to send all messages in fixed data sizes, called blocks. It is desirable to pick the block size so that most of the messages just fit within the block. Messages smaller than the block size are padded with null data to fill out the block. In one example, a block is 12 octets of data. Each block of a message consists of a frame sync, header, and a fixed length of data, 710, as shown in FIG. 7.

This block scheme for communication of data is efficient only if most of the messages occupy all or nearly all of a block. Occasionally, a message must be sent that is necessarily longer than a block. The message is then segmented and sent in two or more blocks. This creates a problem. The first block must be interpreted as the first of a multiple block message, not a complete message. In addition, the second block must be interpreted as the second block of a multiple block message, not the first block or a single block.

This problem is aggravated by the fact that the first block, or any block, could be lost due to interference on the channel. Or a radio may just "tune in" to the channel at the occurrence of the second block, having missed the first block. The result is that the second block, or any block of a message for that matter, may be the actual first block received. While the receiving radio has missed the chance to receive this message, the successive blocks of a multiple block message must not be interpreted as single block messages or first blocks of multiple block messages.

In one embodiment of the present invention, a multiple block indicator, or Message Continuance (MC) field, is created as shown in FIG. 7. The MC field is located in the header portion of each information block 710. The header is part of every block 710 and contains overhead information necessary to communicate the user information successfully. In one embodiment, the MC field occupies two bits and indicates one of four message states, as shown in Table 1, below:

TABLE 1

Message Continuance (MC) Field Codes

| CODE | MESSAGE |
|---|---|
| 00 | This is a middle block of a multiple block message; |
| 01 | this is a first block of a multiple block message; |
| 10 | this is a last block of a multiple block message; |
| 11 | this is a single block message. |

Thus, receiving a single block message indicates that this is the entire message and that the message may be immediately decoded.

Receiving a first block message indicates that this is the first block of a multiple block message and more must be received before the message is complete.

Receiving a middle block message indicates that the message has more blocks to be received before it is complete. If the receiving radio has not just received a first block or a middle block, then this message is "broken" and the block is discarded along with successive blocks until a single or first block is received indicating a new message.

Receiving a last block message indicates that the message is complete. If the first block has also been received, then the message is complete and may be decoded. Otherwise, the message is broken and the block is discarded.

By looking at Bit 1, a receiver, such as a repeater 14, will know if the block is the last (or only) block of the signaling message and, therefore, will immediately output on the outbound channel the busy or idle state of the inbound channel.

By looking at bit 0, a receiver, such as a mobile transceiver 12, will immediately know if the block is the first (or only) block of a signaling message. This allows the transceiver 12 to begin receiving at an arbitrary time, yet know whether or not it has started receiving in the middle of a message. In addition, by looking at bit 0, a transceiver 12 will know if the block is the last (or only) block of the message independent of the block data content.

Thus, the 2 bit field compactly and conveniently indicates if a block is the first, middle, or last block of a single or multiple block message.

Using this approach, only a very small amount of information space is utilized to perform the signalling. The receiving unit gets a very early indication (at the beginning of the block) if this is a single or multiple block message. The receiving unit also gets an indication when it is receiving the last block of a message independent of the block data content. Additionally, a receiving unit arbitrarily beginning to receive in the middle or end of a message gets an indication that it has received an incomplete message.

Those skilled in the art will recognize that other coding methods and other placements of the MC field are possible without departing from the scope and spirit of the present invention. For example, different numbers of bits may be used to define the block's position. Alternatively, different coding schemes may be used to encode the number of blocks yet to transfer. Additionally, different placements of the codes are possible within each block transmission.

Time Slot Reservation

In the case of a repeater using carrier sense multiple access (CSMA), the repeater provides a continuous outbound data stream composed of successive fixed size blocks. The received block times serve to indicate transmitting block times or time slots, on the inbound channel to the repeater. A radio, having just received a block, knows that a timeslot equal to the block time is just available on the inbound channel.

Furthermore, the outbound channel blocks contain a busy/idle indicator to indicate whether or not the inbound channel is busy. A radio may only transmit on the inbound channel to the repeater if the outbound channel from the repeater indicates that the inbound channel is idle. Normally, with single block messages, the outbound channel always indicates idle and the radios compete for each inbound timeslot by simply transmitting a single block message in any timeslot.

In the case of a multiple block message, it is desirable that if the first block for a multiple block message is received by the repeater, then the repeater will immediately indicate that the channel is busy thus allowing the radio to complete the rest of the message blocks without further contention for the timeslots. The MC field in the header allows the repeater to get an early indication that this is a multiple block message and thus provide the busy indication on the outbound channel. In effect, the MC field provides a method of reservation. That is, every radio competes to get a block inbound to the repeater, but once a block is successfully sent, if it is part of a multiple block message as indicated by the MC field, the inbound channel is reserved until the message is completed.

The multiple block indication and standard format indication may be used in conjunction or independently. Furthermore, the present invention is not limited to CSMA systems, but may be employed in any digital system which decodes packetized information. Other coding methods may be employed and the number of bits used may vary without departing from the scope and spirit of the present invention.

What is claimed is:

1. A packetized communication system, comprising a transmitter for transmitting packets, the packets comprising:
    a standard format indicator which is set to a first boolean state for the packets which conform to a predefined standard and which is set to a second boolean state for the packets which do not conform to the predefined standard;

a format type indicator for identifying a type of nonstandard packet for the packets which do not conform to the predefined standard; and nonstandard information for the packets which do not conform to the predefined standard.

2. The packetized communication system of claim 1, wherein the standard format indicator comprises a single binary bit.

3. The packetized communication system of claim 1, wherein the packets further comprise a manufacturer's identification code.

4. The packetized communication system of claim 1, wherein the standard format indicator, the format type indicator, and the nonstandard information are encoded in a link control portion of a packet.

5. The packetized communication system of claim 3, wherein the standard format indicator, the format type indicator, nonstandard information, and the manufacturer's identification code are encoded in a link control portion of a packet.

6. The packetized communication system of claim 1, further comprising a message continuance field.

7. The packetized communication system of claim 6, wherein the message continuance field signals a multiple block message.

8. The packetized communication system of claim 7, wherein the message continuance field signals a first block of the multiple block message.

9. The packetized communication system of claim 7, wherein the message continuance field signals a last block of the multiple block message.

10. The packetized communication system of claim 7, wherein the message continuance field signals a middle block of the multiple block message.

11. The packetized communication system of claim 6, wherein the message continuance field signals a number of blocks in a multiple block message.

12. A method for encoding a packet, comprising the steps of:

encoding the packet with a standard format indicator to indicate if the packet conforms with a predefined standard; and if the packet does not conform to the predefined standard, then encoding the packet with a format type indicator to identify a type of nonstandard packet; and encoding the packet with nonstandard data.

13. The method of claim 12, wherein the standard format indicator comprises a single bit.

14. The method of claim 12, wherein the standard format indicator, the format type indicator, and the nonstandard data are encoded in a link control portion of the packet.

15. The method of claim 12, further comprising the step of encoding the packet with a message continuance field.

16. A method for encoding a packet in a packet radio communications system, comprising the steps of:

encoding the packet with a message continuance field; and if the packet contains multiple blocks, then uniquely encoding a first block, last block, and any intermediate blocks as they are transmitted.

17. A packetized communication system, comprising a receiver for receiving packets, the packets comprising:

a standard format indicator which is set to a first boolean state for the packets which conform to a predefined standard and which is set to a second boolean state for the packets which do not conform to the predefined standard;

a format type indicator for identifying a type of nonstandard packet for the packets which do not conform to the predefined standard; and nonstandard information for the packets which do not conform to the predefined standard.

18. The packetized communication system of claim 17, wherein the standard format indicator comprises a single binary bit.

19. The packetized communication system of claim 17, wherein the packets further comprise a manufacturer's identification code.

20. The packetized communication system of claim 17, wherein the standard format indicator, the format type indicator, and the nonstandard information are encoded in a link control portion of a packet.

21. The packetized communication system of claim 19, wherein the standard format indicator, the format type indicator, the nonstandard information, and the manufacturer's identification code are encoded in a link control portion of a packet.

22. The packetized communication system of claim 17, further comprising a message continuance field.

23. The packetized communication system of claim 22, wherein the message continuance field signals a multiple block message.

24. The packetized communication system of claim 23, wherein the message continuance field signals a first block of the multiple block message.

25. The packetized communication system of claim 23, wherein the message continuance field signals a last block of the multiple block message.

26. The packetized communication system of claim 23, wherein the message continuance field signals a middle block of the multiple block message.

27. The packetized communication system of claim 22, wherein the message continuance field signals a number of blocks in a multiple block message.

28. A method for decoding a packet, comprising the steps of:

decoding a standard format indicator to indicate if the packet conforms with a predefined standard; and if the packet does not conform to the predefined standard, then decoding a format type indicator to identify a type of nonstandard packet; and decoding nonstandard data.

29. The method of claim 28, wherein the standard format indicator comprises a single bit.

30. The method of claim 28, wherein the standard format indicator, the format type indicator, and nonstandard data are decoded in a link control portion of the packet.

31. The method of claim 28, further comprising the step of decoding a message continuance field.

32. A method for decoding a packet in a packet radio communications system, comprising the steps of:

decoding a message continuance field; and if the packet contains multiple blocks, then receiving a first block, last block, and any intermediate blocks as they are transmitted.

33. A method for performing nonstandard link control operations between a plurality of transceivers, the method comprising:

transceiving a packet comprising a standard format indicator to indicate if the packet conforms with a predefined standard;

if the packet does not conform to the predefined standard, then performing the steps comprising:

transceiving the packet comprising:
   a format type indicator to identify a type of nonstandard packet; and
   nonstandard link control data; and performing nonstandard link control operations based on the format type indicator, and the nonstandard link control data.

34. The method of claim 33, wherein the standard format indicator comprises a single bit.

35. The method of claim 33, wherein the standard format indicator, the format type indicator, and the nonstandard link control data are encoded in a link control portion of the packet.

36. A method for time slot reservation in a carrier sense multiple access system, comprising the steps of:

for single block transmissions, signalling an idle channel; and for multiple block transmissions, signalling a busy channel until a last block is detected.

* * * * *